June 2, 1959  A. D. F. MONCRIEFF  2,889,023
APPARATUS FOR ORIENTING WORKPIECES
Filed Aug. 16, 1956  5 Sheets-Sheet 1

INVENTOR.
Alexander D. F. Moncrieff
BY
Harness, Dickey & Pierce
ATTORNEYS.

June 2, 1959 A. D. F. MONCRIEFF 2,889,023
APPARATUS FOR ORIENTING WORKPIECES
Filed Aug. 16, 1956 5 Sheets-Sheet 2
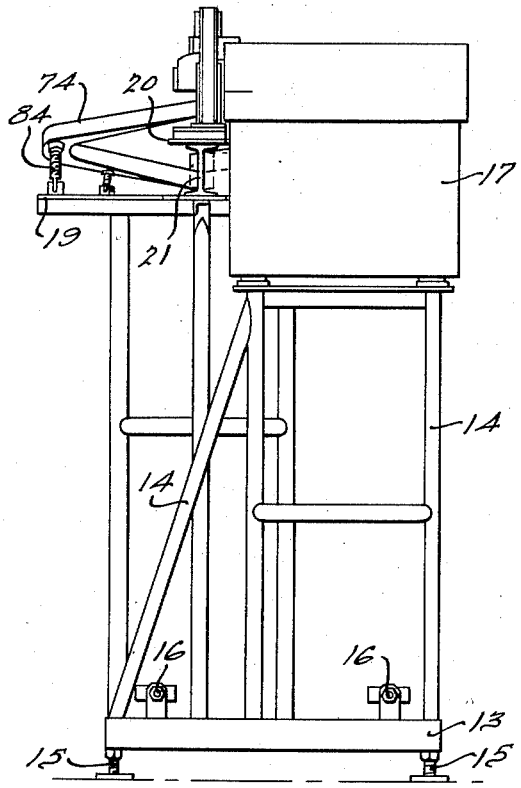
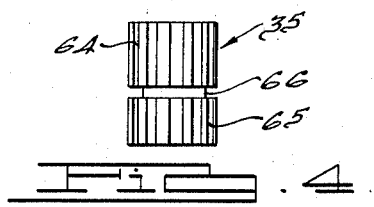
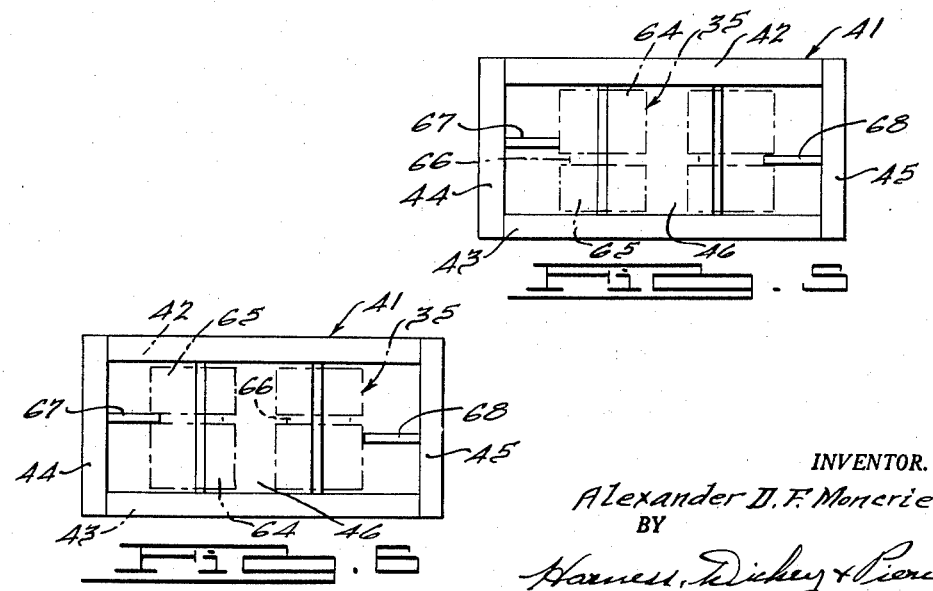
INVENTOR.
Alexander D. F. Moncrieff
BY
ATTORNEYS.

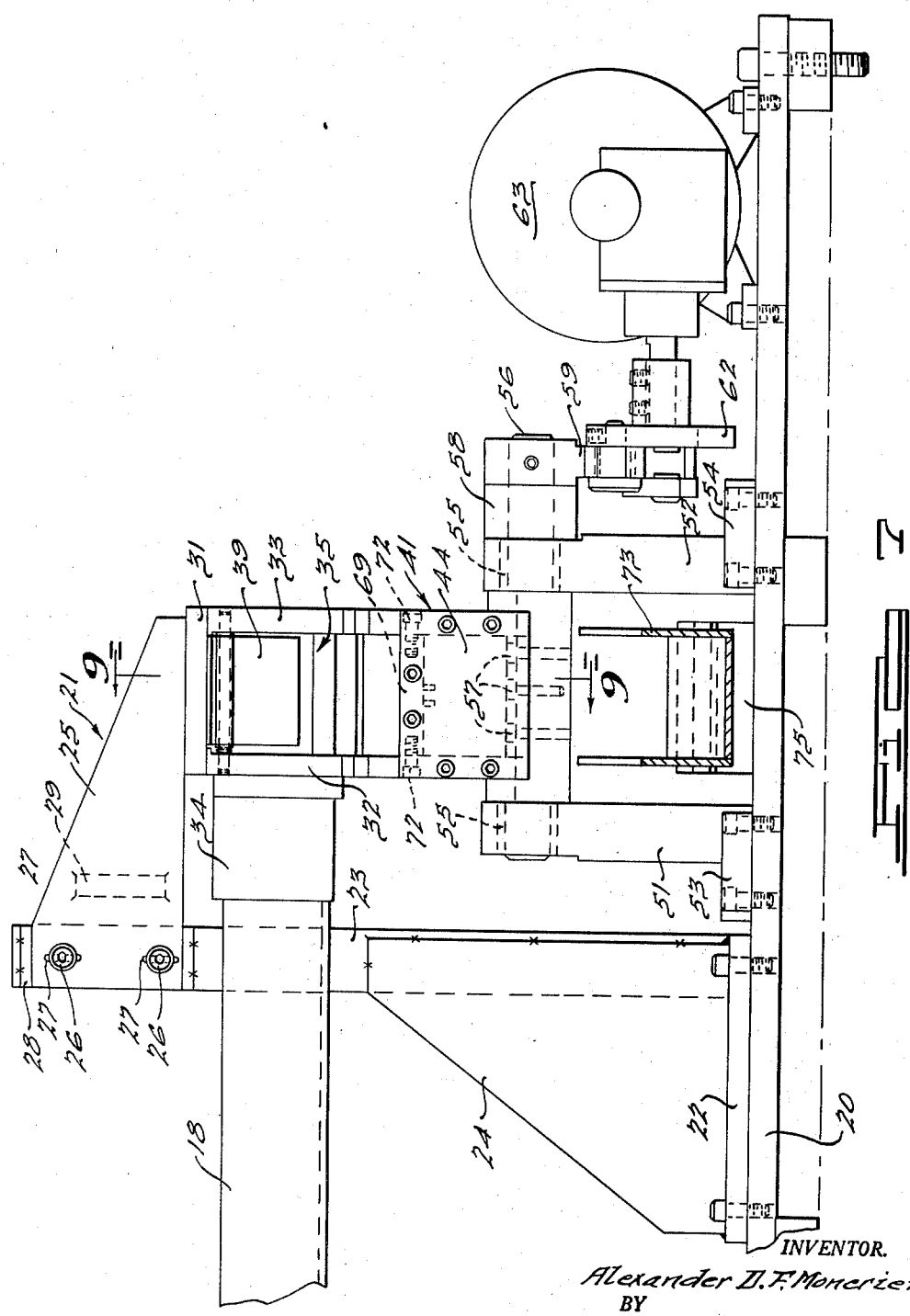

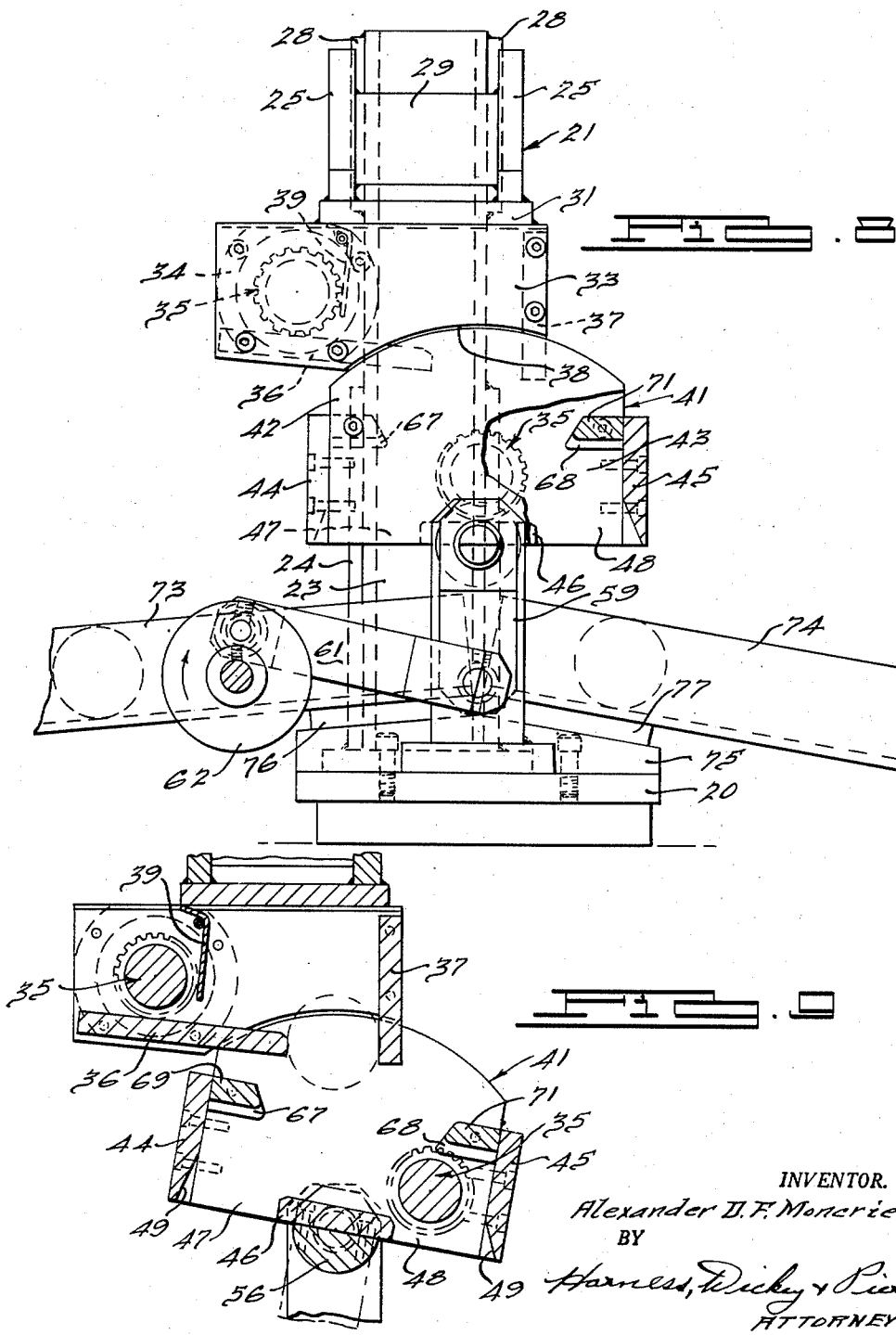

June 2, 1959   A. D. F. MONCRIEFF   2,889,023
APPARATUS FOR ORIENTING WORKPIECES
Filed Aug. 16, 1956   5 Sheets-Sheet 5
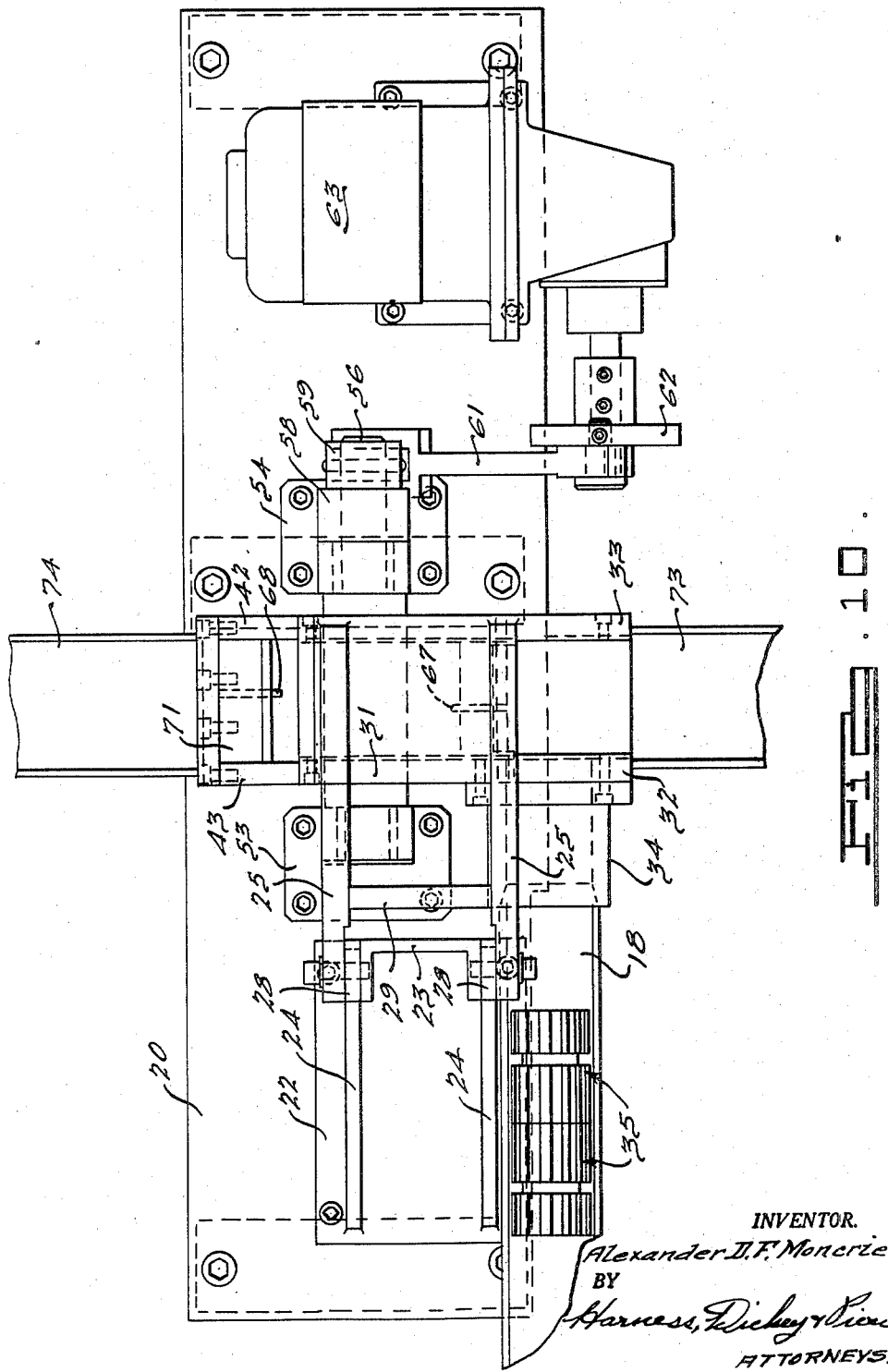
INVENTOR.
Alexander D. F. Moncrieff,
BY
Harness, Dickey & Pierce
ATTORNEYS.

United States Patent Office 2,889,023
Patented June 2, 1959

2,889,023

APPARATUS FOR ORIENTING WORKPIECES

Alexander D. F. Moncrieff, Bloomfield Hills, Mich., assignor to Michigan Tool Company, Detroit, Mich., a corporation of Delaware Application August 16, 1956, Serial No. 604,568

7 Claims. (Cl. 193—43)

This invention relates to the handling of workpieces during a manufacturing process, and more particularly to the sorting of asymmetrical double gears in a semi-finished condition to facilitate the finishing operations on such gears.

In the manufacture of asymmetrical double gears, especially by mass production techniques using automatic machinery, gears leaving one machine at random in a semi-finished state must often be rearranged before entering the next machine so that the longer and shorter teeth of all gears will have the same end-to-end or axial orientation. Orienting devices have been proposed in the past for use with double gears in which the two parts of the gear have unequal diameters. Such devices, however, have not offered satisfactory solutions for the problems involved in orienting asymmetrical double gears in which both parts of each gear have the same diameter.

It is an object of the present invention to provide a novel and improved device for orienting single diameter asymmetrical double gears which will efficiently arrange the gears at a rapid rate, and will aid the mass production of such gears by a series of machines.

It is another object to provide an improved orienting device of the above nature which is relatively simple in construction and will operate in a foolproof manner and without damage to the workpieces being handled.

Other objects, features and advantages of the present invention will become apparent from the subsequent description, taken in conjunction with the accompanying drawings.

In the drawings:

Figure 3 is an end elevational view of the device showing the position of the feeder with respect to the other parts of the apparatus;

Figure 4 is a plan view of a typical double gear of the type which the orienting device is intended to handle;

Figure 5 is a plan schematic view of the hopper showing the manner in which the projections cooperate to permit a gear of a particular orientation to drop only from one end of the hopper;

Figure 6 is a view similar to Figure 5 showing the principle of operation of the device applied to a gear of opposite orientation;

Figure 7 is an enlarged side elevational view of that portion of the device including the hopper and its driving mechanism and showing the means for rockably supporting the hopper;

Figure 8 is a front elevational view of the hopper and its associated elements, parts being broken away for clarity, and showing the oppositely directed troughs leading away from the hopper;

Figure 9 is a fragmentary cross-sectional view taken along the line 9—9 of Figure 7 and showing the hopper in a rocked position with one of the workpieces dropping out of the hopper; and Figure 10 is a plan view of that portion of the mechanism shown in Figure 7 and indicating the position of the workpiece feeding trough with respect to the hopper.

Figure 1:
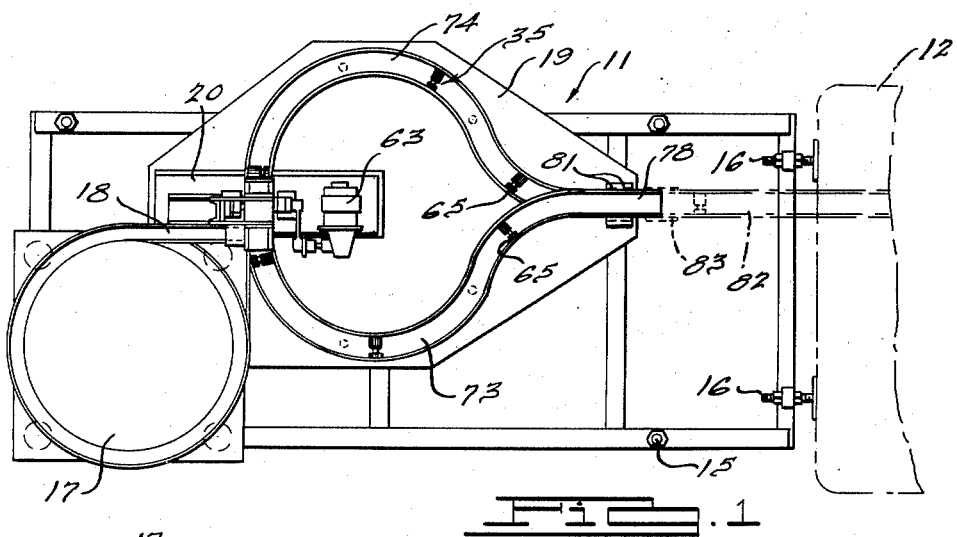
Figure 1 is a plan view of the overall arrangement of the improved parts orienter shown in conjunction with a feeding device for the orienter and a machine into which the oriented parts are to be fed.

The improved orienting device, generally indicated at 11, is adapted to be operated in conjunction with a machine 12 shown in dot-dash lines in the drawings. Machine 12 may comprise an apparatus for automatically finishing asymmetrical double gears, or may comprise other apparatus which requires that such gears or similar parts be fed into it with proper axial orientation of the ends of the workpiece. Device 11 comprises a base 13 having uprights and braces 14 for firmly supporting the parts of the orienter in their proper positions. Base 13 may be provided with adjustable feet 15 and horizontal adjusting members 16 for adjusting device 11 with respect to machine 12.

The workpieces to be oriented are fed into the main portion of orienter 11 from a feeder 17 supported by base 13. This feeder may be of a vibratory or other suitable type having means for receiving a batch of unassorted workpieces and feeding such workpieces in a single row and at a predetermined rate along a horizontal feeding trough 18. In the case of gears, these are fed onto trough 18 with their axes coaxial and parallel to the trough but without orientation as regards the forward and rear ends of the gears.

Before describing in detail the construction and operation of the main portion of orienter 11, a brief general description of its overall arrangement is here given. For purposes of this general description, we will assume that the workpieces fed along trough 18 comprise single diameter asymmetrical double gears with an annular slot between the shorter and longer parts of each gear. As indicated previously, some of these gears will be fed along trough 18 with their longer end foremost, while others will have the opposite orientation. The overall function of orienter 11 is to rearrange the gears so that they will be fed into machine 12 with their axes horizontal and disposed at right angles to their direction of movement, and with the slots of all gears aligned so that the short and long ends will all have the same axial orientation.

To accomplish this overall result, orienter 11 comprises a rockably mounted hopper into which the gears are fed one at a time. This hopper is so arranged and constructed that as it rocks each gear will fall out of one end or the other, depending on the axial orientation of the ends of the gear. A receiving trough is provided for each end of the hopper to catch gears as they roll out of that particular end. Each receiving trough guides the gears which it collects in a looped semi-circular path, to a common area where the gears are reunited into a single row. Since the two receiving troughs collect gears of opposite orientation, and since they loop in opposite directions, the single row of reunited gears will all have the same orientation for feeding into machine 12.

Referring now in greater detail to the embodiment of the invention illustrated in the drawings, a platform 19 is provided on top of base 13, being supported by uprights 14, this platform being of irregular shape as shown in Figure 1 and of sufficient size to accommodate the various elements of the orienter. Spaced above platform 19 is a smaller platform 20, supported by an I-beam 21, and on which a major portion of the elements of orienter 11 are located. Secured to platform 20 adjacent the outer end of trough 18 is a supporting assembly which serves to hold the outer end of this trough as well as other elements described below. The supporting assembly comprises a base portion 22 and an upright 23 of channel-shaped cross section supported by angular gusset plates 24. Two similarly shaped cantilever beams 25 are secured to the upper end of upright 23 by bolts 26 disposed in vertically elongated slots 27, spacer plates 28 being disposed between beams 25 and the sides of upright 23. A transverse reinforcing member 29 is secured between beams 25. It will therefore be seen that the two beams may be adjustably secured as a unit at various heights with respect to platform 20.

A plate 31 is secured to the undersides of beams 25, this plate having in turn a pair of parallel walls 32 and 33 secured to its lower surface and extending therebelow. Walls 32 and 33 extend transversely to trough 18, and are shaped as shown in Figure 8 to receive gears from said trough and to guide these gears toward the hopper, as described below. An annular member 34 is secured over an opening near one end of wall 32 facing trough 18, this member being of sufficient size to receive the end of the trough for supporting purposes and to permit gears 35 to pass into the space between walls 32 and 33. An inclined ramp 36 is secured between the lower portions of walls 32 and 33, this ramp extending partway toward the opposite ends of the walls and being adapted to guide gears 35 toward the hopper after they pass through member 34 onto the upper end of the ramp. The spacing between walls 32 and 33 is approximately equal to and sufficient to accommodate the total length of each of the double gears. A barrier 37 is secured in a vertical position between the ends of walls 32 and 33 toward which gears 35 will roll when on ramp 36, the space between the lower end of barrier 37 and the lower end of ramp 36 being sufficient to permit the gears to drop one at a time from between walls 32 and 33. Adjacent this area, the walls are provided with arcuate lower edges 38, concave downwardly to accommodate the hopper which is disposed therebelow. A pivoted retarding member 39 may also be provided between walls 32 and 33 for delaying each gear 35 as it arrives at the top of ram 36, so that the spacing between gears as they roll down the ramp may be controlled.

The hopper is generally indicated at 41, and comprises a pair of side walls 42 and 43 to which are secured end walls 44 and 45. The bottom of hopper 41 is provided with a platform 46 for arresting each gear 35 as it drops from ramp 36. The hopper bottom is open on both sides of central member 46, as best seen in Figure 9, to permit the gears to drop from the hopper as hereinafter described. In particular, a space 47 exists between one edge of member 46 and end wall 44, while a second space 48 extends between the other edge of member 46 and end wall 45. Spaces 47 and 48 are large enough to permit gears 35 to pass therethrough, and the lower ends of walls 44 and 45 may be provided with clearance notches 49 to aid in passage of the gears.

Hopper 41 is rockably mounted on a pair of posts 51 and 52, best seen in Figure 7, which are secured to platform 20 by feet 53 and 54 respectively. The upper ends of posts 51 and 52 are provided with bearings 55 within which are disposed the journaled portions of a shaft 56, the shaft having a relatively thick central section extending between posts 51 and 52. This central section is notched out to receive the lower portion of hopper 41, with the lower surface of platform 46 engaging the shaft and receiving bolts 57 which pass through the shaft, as indicated in Figure 7. One end of shaft 56 projects outwardly from post 52 and carries a spacer 58 and a crank arm 59. As best seen in Figure 8, the lower end of crank arm 59 carries a connecting rod 61 pivoted thereto, the other end of the connecting rod being pivoted eccentrically to a disk 62 driven by an electric motor 63 on platform 20. The relative dimensions of the parts are such that when motor 63 is energized, hopper 41 will be rocked through an arc of approximately 20° with its center position being horizontal, as shown in Figure 8. The rate and angle at which hopper 41 is oscillated may vary according to particular requirements, but is preferably such that gears 35 may be dropped therefrom at least as rapidly as they are fed from ramp 36. The upper edges of side walls 42 and 43 of the hopper are arcuately shaped, as seen in Figures 8 and 9, the centers of these arcs being on the axis of shaft 56, and these edges are closely adjacent edges 38 of guide walls 32 and 33.

Before describing in detail the construction within hopper 41 which automatically separates gears 35 according to their orientation within the hopper, the construction of gears 35 should be further examined. A gear 35 is shown in detail in Figure 4, and comprises two sets of teeth 64 and 65 respectively, teeth 64 being longer than teeth 65 with both sets having the same diameter. An annular slot 66 is disposed between the two sets of teeth, this slot of course being of a width and at a location selected according to the requirements of the particular workpiece.

The principle of operation of the hopper is shown schematically in Figures 5 and 6. In each of these figures, a plan view of the hopper is shown, and a single workpiece is shown in two positions in each of the figures. In Figure 5, the workpiece (a gear 35) is oriented with its longer teeth 64 toward the top of the figure, adjacent side wall 42, and its shorter teeth 65 adjacent side wall 43. In Figure 6, on the other hand shorter teeth 65 are adjacent wall 42 while longer teeth 64 are adjacent wall 43. Gears dropping into hopper 41 must have either of these two axial orientations.

Two fingers or projections 67 and 68 are provided within hopper 41, projection 67 extending from end wall 44 while projection 68 extends from end wall 45. The effective thickness of each of these projections is slightly less than the width of annular slot 66 in each gear 35, but the lateral positions of these projections with respect to end walls 44 and 45 are such that, for any particular gear 35 within hopper 41, only one projection will be aligned with slot 66. In particular, projection 67 is so located on end wall 44 that only when gear 35 is oriented as shown in Figure 6 will projection 67 be aligned with slot 66, while projection 68 will be misaligned with slot 66 and engageable with the longer set of teeth 64. However, when gear 35 is oriented as shown in Figure 5, projection 68 will be aligned with slot 66 while projection 67 will be engageable with teeth 64.

As seen best in Figure 9, the location and configuration of projections 67 and 68 with respect to hopper openings 47 and 48 are such that engagement of teeth 64 with either projection will prevent a gear 35 from dropping through the corresponding opening. On the other hand, alignment of either projection with slot 66 will result in a gear dropping through the corresponding opening as it rolls up to that projection. Assuming, therefore, that a gear 35 drops into the hopper while the latter is in its central or horizontal position, and the hopper rocks in one direction and then the other, the gear 35 will drop from the hopper during either the first or second portions of the rocking motion and through either opening 47 and 48, depending on its axial orientation. It may be noted that projections 67 and 68 are formed as part of members 69 and 71 respectively which extend between hopper side walls 42 and 43 and are secured thereto by bolts 72, as seen in Figures 7, 8 and 9.

Figure 2:
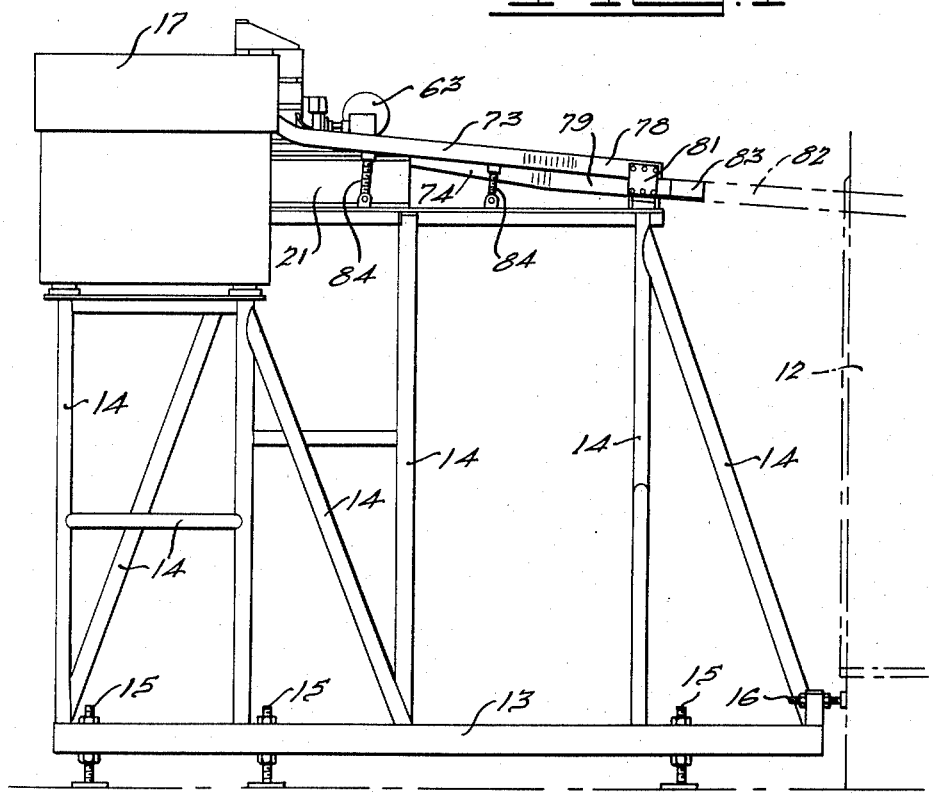
Figure 2 is a side elevational view of the device shown in Figure 1, indicating the manner in which the ramps slope downwardly toward the machine.

Two receiving troughs 73 and 74 are provided for the gears 35 dropping from hopper openings 47 and 48 respectively. These troughs have cross-sectional shapes which adapt them for guiding the workpieces as they roll with their axes transverse to the troughs, unlike feeding trough 18 in which the gears are coaxial and have their axes parallel to their direction of movement. Both troughs 73 and 74 are of a configuration generally resembling that of a question mark, but with their curvatures in opposite directions, as best seen in Figure 1. The troughs are furthermore inclined, as shown in Figure 2, so that gears delivered to their upper ends will roll around the curved portions of the troughs and then along the straight portions.

The upper ends of troughs 73 and 74 are supported by a member 75 resting on platform 20 and by spacers 76 and 77 respectively. The upper end of trough 73 is immediately below opening 47 of the hopper so that gears having one orientation will drop onto this trough. The upper end of trough 74 on the other hand is disposed immediately below hopper opening 48 so that it will receive gears of the opposite orientation. The straight portions of troughs 73 and 74 are indicated at 78 and 79 respectively in Figures 1 and 2. Section 78 is directly above section 79, being joined thereto by brackets 81, and is somewhat shorter than section 79. Gears traveling along section 78 will therefore drop among gears traveling along section 79, the single line of gears being received by a trough 82 leading into the entrance of machine 12. A connecting member 83 may be provided between the lower end of section 79 and the upper end of trough 82. A plurality of adjustable supports 84 may also be provided for regulating the height of various portions of troughs 73 and 74 in accordance with requirements.

In operation of the device, feeder 17 will be loaded with workpieces such as gears 35 and will be energized thereby feeding the gears along trough 18. At the same time, motor 63 will be energized, causing oscillation of hopper 41 on its pivot axis in a regular manner about its central horizontal position. When the first gear 35 has passed onto the upper end of ramp 36, it will roll down this ramp between guide walls 32 and 33, being retarded during the initial portion of its descent by swinging member 39. When the gear reaches the lower end of ramp 36, it will drop down into hopper 41, engaging platform 46 at the bottom of the hopper. Assuming that this first gear 35 happens to be oriented in the position shown in Figure 5, and that it engages platform 46 when the hopper is passing through its central position shown in Figure 8, continued rotation of disk 62 in the direction of the arrow will cause hopper 41 to rock counterclockwise as shown in Figure 8. Gear 35 will roll on platform 46 toward end wall 44 of the hopper, and a portion of its longer teeth 64 will strike projection 67, as shown in the left hand portion of Figure 5. Since the spacing between finger 67 and platform 46 is insufficient to permit gear 35 to pass therethrough, it will remain in this position until the hopper rocks clockwise in the other direction. When hopper 41 approaches the position shown in Figure 9, gear 35 will roll to the right toward end wall 45. Annular slot 66 being aligned with projection 68, the gear will clear this projection and roll off platform 46 and through opening 48, landing on the upper end of receiving trough 74 and rolling around this trough onto the straight lower section 79 thereof. As seen in Figure 1, gear 35 will arrive on section 79 with its shorter teeth 65 toward the lower end of the drawing.

During this process, another gear 35 will have arrived on the upper end of ramp 36 and will roll into hopper 41 in the same manner as the first gear, retarding member 39 preventing interference between the gears. Assuming the orientation of the second gear 35 is as shown in Figure 6, this gear will be prevented by projection 68 from dropping onto trough 74, but will clear projection 67 and pass through opening 47 onto trough 73. This second gear 35 will roll around trough 73 and arrive on straight section 78 thereof. Like the gear on straight section 79, the gear on section 78 will have its shorter teeth 65 toward the bottom of the drawing in Figure 1. The gears from both sections will commingle as they pass onto trough 82 and will be fed with the same axial orientation into machine 12. The device will continue to operate in this manner as long as gears are fed onto trough 18, automatically orienting gears which are delivered regardless of the random nature of the original orientation.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a device for arranging a plurality of asymmetrical double gears so as to have uniform axial orientation, an enclosure for receiving at least one of said gears at a time, said enclosure being of such dimensions as to permit movement of said gear within the enclosure in a direction transverse to the gear axis while maintaining the axial orientation of the gear, a pair of spaced openings in said enclosure, means for oscillating a gear within said enclosure in a direction transverse to the gear axis, whereby the gear will approach said openings alternately, means for permitting a gear within said enclosure to pass through only one of said openings when said gear has one axial orientation and to pass through only the other opening when said gear has the opposite orientation, and means for guiding gears passing through said openings into a single row in which all gears have the same axial orientation.

2. In a device for arranging a plurality of asymmetrical double gears so as to have uniform axial orientation, an enclosure having a width substantially equal to the total length of each gear and a length sufficiently great to permit rolling movement of a gear within the enclosure in a direction transverse to the gear axis, means for feeding individual gears into said enclosure, a pair of spaced openings in said enclosure, means for oscillating said enclosure whereby a gear within the enclosure will approach said openings alternately, means for obstructing passage of a gear through only one of said openings when said gear has one axial orientation and for obstructing passage of a gear through only said other opening when said gear has the opposite axial orientation, and means for separately guiding gears passing through said two openings into a single row of gears having uniform axial orientation.

3. In a device for arranging a plurality of identical asymmetrical double gears so as to have uniform axial orientation, means for feeding said gears along a path with random axial orientation, an enclosure having a width substantially equal to the total length of each gear and a length sufficiently great to permit movement of a gear within the enclosure in a direction transverse to the gear axis, means for feeding said gears singly from said path into the top of said enclosure, a pair of spaced openings in said enclosure adjacent the opposite ends thereof, said openings being of sufficient size to allow a gear to pass therethrough, a pair of obstructing elements within said enclosure and adjacent said openings respectively, one of said obstructing elements being so positioned as to permit passage of a gear through its corresponding opening only when said gear has one axial orientation, the other obstructing element being so positioned as to permit passage of a gear through its corresponding opening only when said gear has the opposite axial orientation, and guide means adjacent said openings for combining the gears leaving said two openings into a single row of gears having uniform axial orientation.

4. In a device for creating uniform axial orientation among a plurality of identical asymmetrical single diameter slotted double gears, an enclosure having a width substantially equal to the total length of each gear and a length sufficiently great to permit movement of the gears therewithin, means for feeding single gears with random axial orientation into said enclosure, means for oscillating said enclosure, a platform in said enclosure upon which a gear disposed therein may roll during such oscillation, a pair of openings adjacent the opposite ends of said enclosure of sufficient size to permit a gear to pass therethrough, a projection adjacent one of said openings, said projection being aligned with the slot of a gear having one axial orientation whereby such gear will be permitted to pass through the corresponding opening, and a second projection adjacent the other opening, said second projection being aligned with the slot of a gear having the opposite axial orientation, whereby such gear will be permitted to pass through said other opening.

5. In a device for handling single diameter double gears of the type having one set of longer teeth and one set of shorter teeth separated by a slot, a hopper having side walls spaced apart a distance approximately equal to the total length of each gear, end walls on said hopper spaced apart a distance substantially greater than the diameter of each gear, a platform centrally located at the bottom of said hopper, openings in the bottom of said hopper adjacent the opposite ends thereof, means for dropping single gears into said hopper with the ends of said gears adjacent said side walls but without regard to the orientation of said longer and shorter teeth, means for oscillating said hopper back and forth whereby a gear resting on said platform will roll alternately toward said two openings, the openings being of such size as to normally permit a gear to pass therethrough, a projection within said hopper adjacent one of said openings, said projection being aligned with the slot of a gear when said gear has a first axial orientation within the hopper but being engageable by the longer teeth of a gear when such gear has the opposite axial orientation, the position of said projection with respect to its corresponding opening being such that engagement of the longer teeth of a gear with said projection will prevent such gear from leaving the hopper through such opening, and a second projection in said hopper adjacent the other opening, said projection being aligned with the slot of a gear having said opposite orientation but being engageable with the longer teeth of a gear having said first orientation.

6. The combination according to claim 5, further provided with means for combining gears dropping from said two openings into a single row of gears having uniform axial orientation.

7. In a device for rearranging identical single diameter asymmetrical double gears having slots between their shorter and longer sets of teeth, a feeding trough, means for moving gears along said trough in coaxial relation but with random end-to-end orientation, an inclined ramp at the end of and at right angles to said feeding trough, whereby gears reaching the end of said feeding trough will roll down said ramp, a hopper pivotally mounted adjacent the lower end of said ramp, said hopper having side walls spaced apart a distance approximately equal to the total length of said gears, a central platform located at the bottom of said hopper, said platform being adapted to arrest and support gears dropping from said ramp into said hopper, first and second openings in the bottom of said hopper on opposite sides of said platform, each of said openings being of sufficient size to normally permit a gear to drop therethrough, means for applying a rocking motion to said hopper, whereby a gear resting on said platform will alternately approach said first and second openings, first and second projections within said hopper adjacent said first and second openings respectively, the thickness of each of said projections being less than the width of the gear slots, said first projection being aligned with the gear slots of gears having one end-to-end orientation within said hopper but being engageable with the longer teeth of gears having the opposite end-to-end orientation, whereby passage through said first opening of such gears having said opposite orientation will be prevented, said second projection being aligned with the slots of gears having said opposite orientation but being engageable with the longer teeth of gears having said first orientation, whereby only gears having said first orientation may drop through said first opening and only gears having said second orientation may drop through said second opening, a first inclined trough having its upper end beneath said first opening, said first trough having an arcuate section causing gears dropping thereon to be guided in a semicircular path, and a straight section leading from the lower end of said arcuate section, a second inclined trough having its upper end beneath said second hopper opening, said second trough having an arcuate section causing gears dropped thereon to be guided in a semicircular path opposite to said first semicircular path, and a straight section disposed above the straight section of said first inclined trough, whereby said gears will be delivered in a single row having uniform end-to-end orientation.

References Cited in the file of this patent

UNITED STATES PATENTS

| 736,622 | Olin | Aug. 18, 1903 |
| 971,999 | Hodge | Oct. 4, 1910 |
| 1,551,614 | Paridon | Sept. 1, 1925 |
| 2,752,028 | Moskowitz | June 26, 1956 |

FOREIGN PATENTS

| 715,692 | Germany | Jan. 5, 1942 |